United States Patent
Katayama et al.

(10) Patent No.: US 7,719,596 B2
(45) Date of Patent: May 18, 2010

(54) DISPLAY APPARATUS, BURN-IN CORRECTION SYSTEM AND BURN-IN CORRECTION METHOD

(75) Inventors: Takahiro Katayama, Daito (JP); Toshihiro Takagi, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 474 days.

(21) Appl. No.: 11/727,383

(22) Filed: Mar. 26, 2007

(65) Prior Publication Data

US 2007/0222860 A1  Sep. 27, 2007

(30) Foreign Application Priority Data

Mar. 27, 2006  (JP)  ............... 2006-085983

(51) Int. Cl.
*H04N 5/222* (2006.01)

(52) U.S. Cl. .............. 348/333.12; 345/92; 345/10; 348/189

(58) Field of Classification Search ........... 348/173, 348/189, 191, 687, 658; 345/76, 92, 10, 345/102, 123, 173, 124, 126

See application file for complete search history.

(56) References Cited

U.S. PATENT DOCUMENTS

| | | | |
|---|---|---|---|
| 5,793,344 A | 8/1998 | Koyama | |
| 6,285,349 B1 | 9/2001 | Smith | |
| 6,456,339 B1 * | 9/2002 | Surati et al. | 348/745 |
| 6,549,183 B1 | 4/2003 | Koyama | |
| 2003/0193489 A1 | 10/2003 | Koyama | |
| 2005/0052369 A1 * | 3/2005 | Tada | 345/76 |

FOREIGN PATENT DOCUMENTS

| | | |
|---|---|---|
| CN | 1089522 C | 8/2002 |
| EP | 0 923 067 A1 | 6/1999 |
| EP | 1 194 013 A1 | 4/2002 |
| JP | 2003-264847 A | 9/2003 |
| JP | 2004-109246 A | 4/2004 |
| JP | 2006-3607 A | 1/2006 |

OTHER PUBLICATIONS

Chinese Office Action dated Sep. 26, 2008 w/English translation (twelve (12) pages).
Extended European Search Report dated Jun. 19, 2007 (six (6) pages).

* cited by examiner

*Primary Examiner*—Tuan Ho
(74) *Attorney, Agent, or Firm*—Crowell & Moring LLP

(57) ABSTRACT

A burn-in correction system including a display unit equipped with a display panel displaying an image according to input image data, and an imaging unit acquiring imaged image data by imaging the display panel from a viewing side, the system correcting burn-in on the display panel. The system further includes: a lighting unit lighting each pixel constituting the display panel in order under a preset lighting condition; a calculation unit calculating a difference value between luminance of the imaged image data of each pixel lighted by the lighting unit, the imaged image data acquired by imaging each lighted pixel with the imaging unit, and luminance preset in the lighting condition; and a correction unit correcting luminance of each pixel based on the input image data, the correcting performed based on the difference value calculated by the calculation unit.

4 Claims, 7 Drawing Sheets

DISPLAY APPARATUS, BURN-IN CORRECTION SYSTEM AND BURN-IN CORRECTION METHOD

BACKGROUND OF THE INVENTION

1. Field of the Invention

The present invention relates to a display apparatus equipped with a burn-in correction function, a burn-in correction system and a burn-in correction method.

2. Related Art

The phenomenon called as burn-in sometimes occurs in a display apparatus equipped with a display panel such as a liquid crystal display (LCD) and a plasma display panel (PDP). The burn-in is the phenomenon in which the trace of a pattern remains on a display screen when the same image has been displayed over a long time, or when the cumulative display time of the same image becomes a long time. If the burn-in occurs, the light emission state of the burn-in place has changed to make it impossible to perform an adequate display. Accordingly, various techniques have been conventionally proposed for settling the burn-in phenomenon.

For example, Patent Document 1 discloses a projector which is equipped with a color unevenness correction circuit and can correct the color unevenness on a projection screen by measuring the luminance of each block of a projected image based on an image signal of a fixed luminance level, which is projected on the screen with a luminance meter or a video camera, by acquiring a parameter for color unevenness correction based on a difference between the measured value and a reference value to set the acquired difference in a register of the color unevenness correction circuit, and by performing the color unevenness correction of the image signal based on the parameter in the register with the color unevenness correction circuit.

Moreover, for example, Patent Document 2 discloses a projection system capable of generating a proper image in conformity to the situation of a projection plane by acquiring an image by the camera unit's imaging of a pattern which is projected by a projector unit and the luminance of which stepwise changes at regular intervals, by the camera control unit's setting of correction values for gradation property correction so that the stepwise variation quantities of the brightness of the area of the acquired image in which the pattern is projected may be arranged at regular intervals, by the γ correction circuit's correction of the gradation property of a photographed image acquired by the camera unit based on the correction value set by the camera control unit after the camera control unit's setting of the correction values for the gradation property correction, and by the device drive control function's correction of the gradation property of the projected image to be projected on the projection plane from the projector unit.

Furthermore, for example, Patent Document 3 discloses a convergence adjustment system performing the adjustment of the distortion of an image by the digital camera's imaging of the whole image projected by a liquid crystal projector to read the image property of the imaged image by means of a program, and by capturing the misalignment in the horizontal direction and the vertical direction of each color signal, the misalignment of the angle thereof, the misalignment in the depth direction thereof, and the misalignment caused by low angle photographing.

[Patent Document 1] JP-A 2006-003607
[Patent Document 2] JP-A 2004-109246
[Patent Document 3] JP-A 2003-264847

Because burn-in is a deterioration phenomenon occurring by the pixel constituting a screen, it is necessary to perform the detection and the correction of a burn-in place by the pixel in order to perform an accurate correction. However, according to the techniques disclosed in Patent Document 1 and Patent Document 2, it is possible to correct color deterioration and the like, but, because both of the techniques correct the parts where color unevenness has occurred by imaging the whole screen with a video camera or the like, both the techniques have the problem of the impossibility of performing accurate detection of a place where color light emission is deteriorated to perform adequate correction. Moreover, the technique disclosed in Patent Document 3 can capture the misalignment quantities, but cannot perform the detection and the correction of burn-in by the pixel, and consequently cannot accurately correct color deterioration owing to the burn-in.

SUMMARY OF THE INVENTION

An object of the present invention is to provide a display apparatus equipped with a burn-in correction function capable of correcting color deterioration owing to burn-in accurately by performing the detection and the correction of the burn-in by the pixel, a burn-in correction system and a burn-in correction method.

In order to solve the above problem, in accordance with a first aspect of the invention, the burn-in correction system including a display unit equipped with a display panel displaying an image according to input image data, and an imaging unit connected to the display unit through a communication line, the imaging unit acquiring imaged image data by imaging the display panel from a viewing side, the system correcting burn-in on the display panel, the system includes:

a lighting unit lighting each pixel constituting the display panel in order under a preset lighting condition;

a calculation unit calculating a difference value between luminance of the imaged image data of each pixel lighted by the lighting unit, the imaged image data acquired by imaging each lighted pixel with the imaging unit, and luminance preset in the lighting condition; and a correction unit correcting luminance of each pixel based on the input image data, the correcting performed based on the difference value calculated by the calculation unit.

According to the first aspect of the present invention, the lighting unit lights each pixel constituting the display panel in order under the preset lighting condition, and the imaging unit acquires the imaged image data by imaging each pixel lighted by the lighting unit from the viewing side. Moreover, the calculation unit calculates the difference value between the luminance of the imaged image data, which is acquired by the imaging unit, of each pixel, and the luminance preset in the lighting condition, and furthermore the correction unit corrects the luminance of each pixel based on the input image data, the correction performed based on the difference value calculated by the calculation unit. Consequently, the detection and the correction of the burn-in are performed by the pixel, and thereby the color deterioration owing to the burn-in can be accurately corrected.

In accordance with a second aspect of the invention, the display apparatus connected to an imaging unit acquiring imaged image data through a communication line, the apparatus equipped with a display panel displaying an image according to input image data, includes:

a lighting unit lighting each pixel constituting the display panel in order under a preset lighting condition; and a correction unit correcting luminance of each pixel based on the input image data, the correcting performed based on luminance of the imaged image data of each pixel acquired by imaging each pixel with the imaging unit from a viewing side, each pixel lighted by the lighting unit.

According to the second aspect of the invention, the lighting unit lights each pixel constituting the display panel in order under the preset lighting condition, and the imaging unit acquires the imaged image data by imaging each pixel lighted by the lighting unit, the imaging being performed from the viewing side. Furthermore, the correction unit corrects the luminance of each pixel based on the input image data, the correction performed based on the luminance of the imaged image data of each pixel acquired by the imaging unit. Consequently, the detection and the correction of the burn-in are performed by the pixel, and thereby the color deterioration owing to the burn-in can be accurately corrected.

Preferably, the correction unit includes a calculation unit calculating a difference value between the luminance of the imaged image data of each pixel, the luminance acquired by the imaging unit, and luminance preset in the lighting condition, and the correction unit corrects the luminance of each pixel based on the input image data, the correction performed based on the difference value calculated by the calculation unit.

According to such a display apparatus, it is a matter of course to be able to acquire the advantage of the second aspect. Moreover, the correction unit calculates the difference value between the luminance of the imaged image data of each pixel, the luminance acquired by the imaging unit, and the luminance preset in the lighting condition with the calculation unit, and the correction unit corrects the luminance of each pixel based on the input image data, the correction performed based on the difference value calculated by the calculation unit. Consequently, the display apparatus can correct the color deterioration owing to the burn-in in the adequate and simple configuration.

In accordance with a third aspect of the invention, the burn-in correction method for a burn-in correction system including a display apparatus equipped with a display panel displaying an image according to input image data, and an imaging apparatus connected to the display apparatus through a communication line, the method being for correcting burn-in on the display panel, the method includes the steps of:

lighting each pixel constituting the display panel in order under a preset lighting condition;

acquiring imaged image data by imaging each lighted pixel from a viewing side with the imaging apparatus; and correcting luminance of each pixel based on the input image data, the correcting performed based on luminance of the imaged image data of each pixel, the imaged image data acquired by the imaging apparatus.

According to the third aspect of the invention, the burn-in correction method includes the steps of: lighting each pixel constituting the display panel in order under the preset lighting condition; acquiring the imaged image data by imaging each lighted pixel from viewing side with the imaging apparatus; and correcting the luminance of each pixel based on the input image data, the correcting performed based on the luminance of the imaged image data of each pixel, the imaged image data acquired by the imaging apparatus. Consequently, the detection and the correction of the burn-in are performed by the pixel, and thereby the color deterioration owing to the burn-in can be accurately corrected.

BRIEF DESCRIPTION OF THE DRAWINGS

The present invention will be more fully understood from the detailed description given herein after and the accompanying drawings given by way of illustration only, and thus are not intended as a definition of limits of the present invention, and wherein.

DETAILED DESCRIPTION OF THE PREFERRED EMBODIMENTS

In the following, an embodiment of the present invention will be described in detail, referring to the attached drawings.

Figure 1:
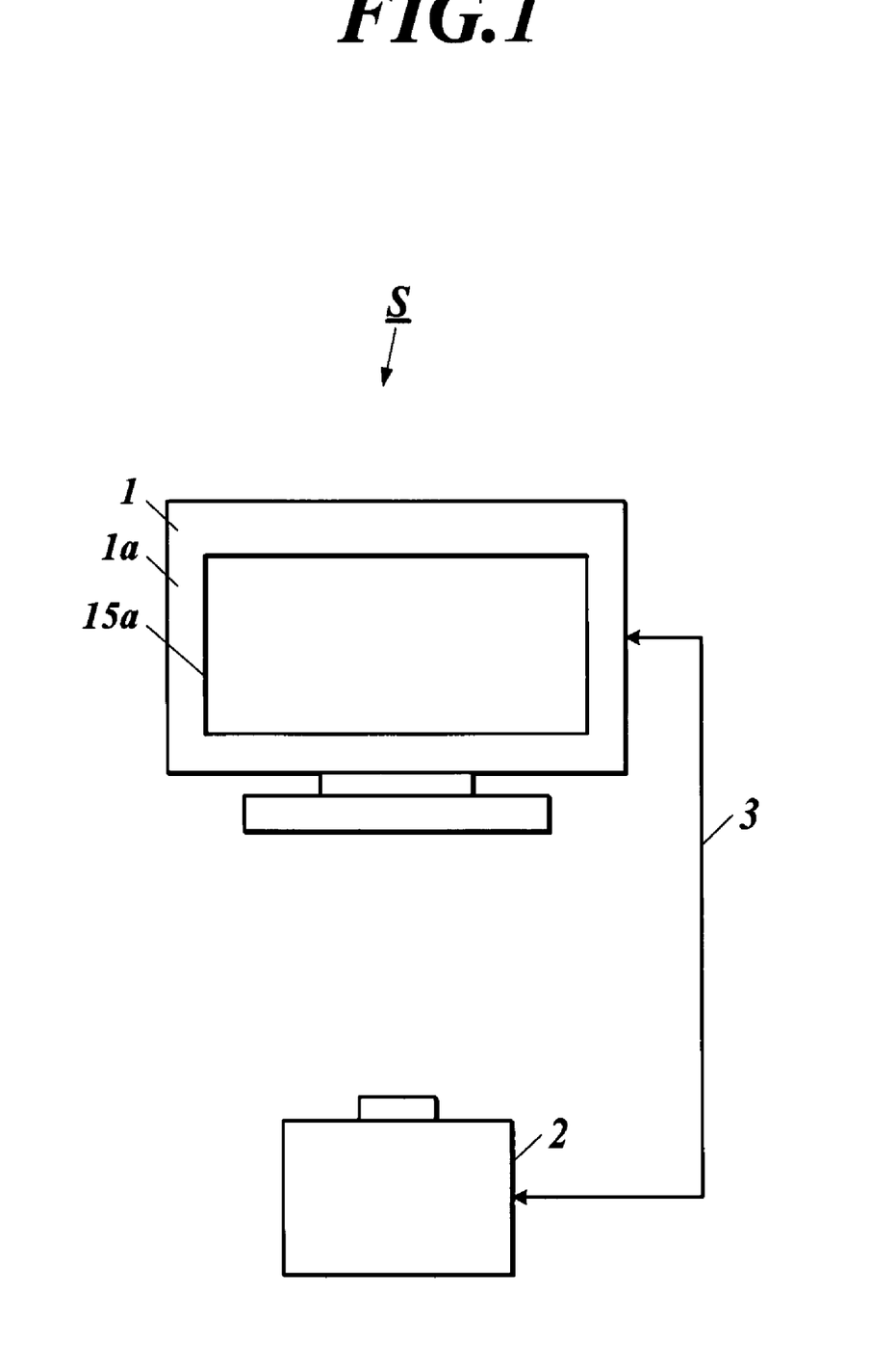
FIG. 1 is a system configuration diagram of a burn-in correction system of the present embodiment.
Figure 2:
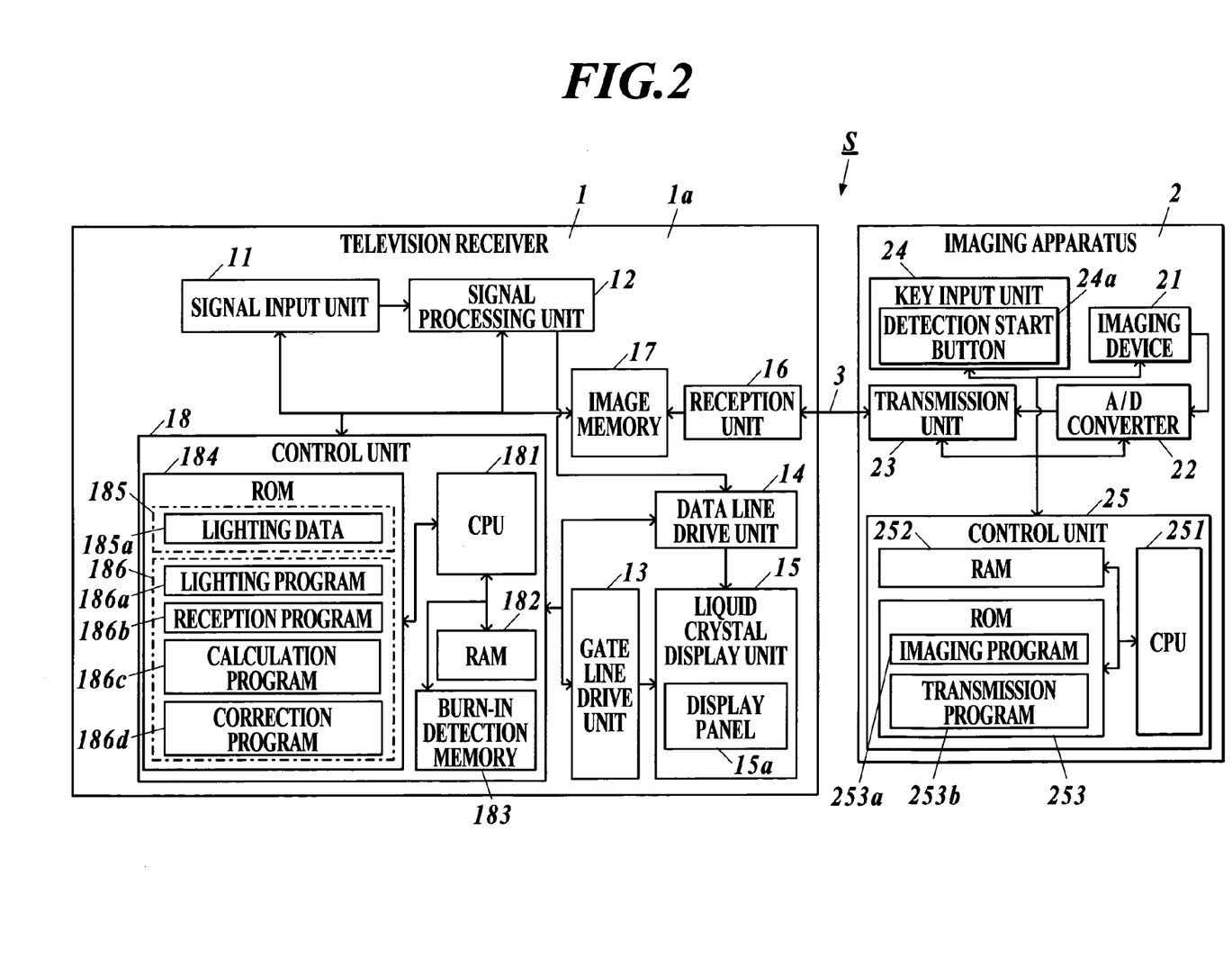
FIG. 2 is a block diagram showing the configuration of the principal parts of a television receiver and an imaging apparatus that constitute the burn-in correction system of the present embodiment.
Figure 3:
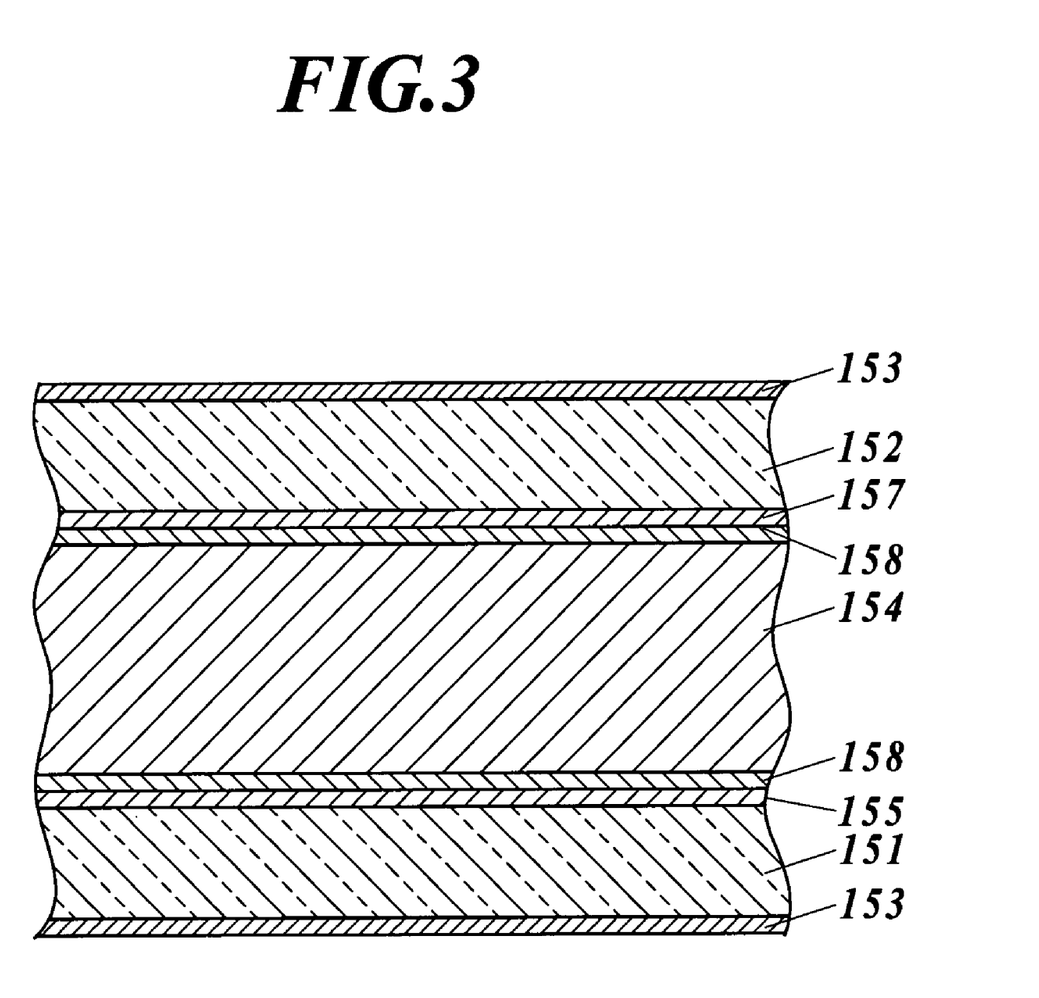
FIG. 3 is a sectional view of a liquid crystal display unit provided in the television receiver.
Figure 4:
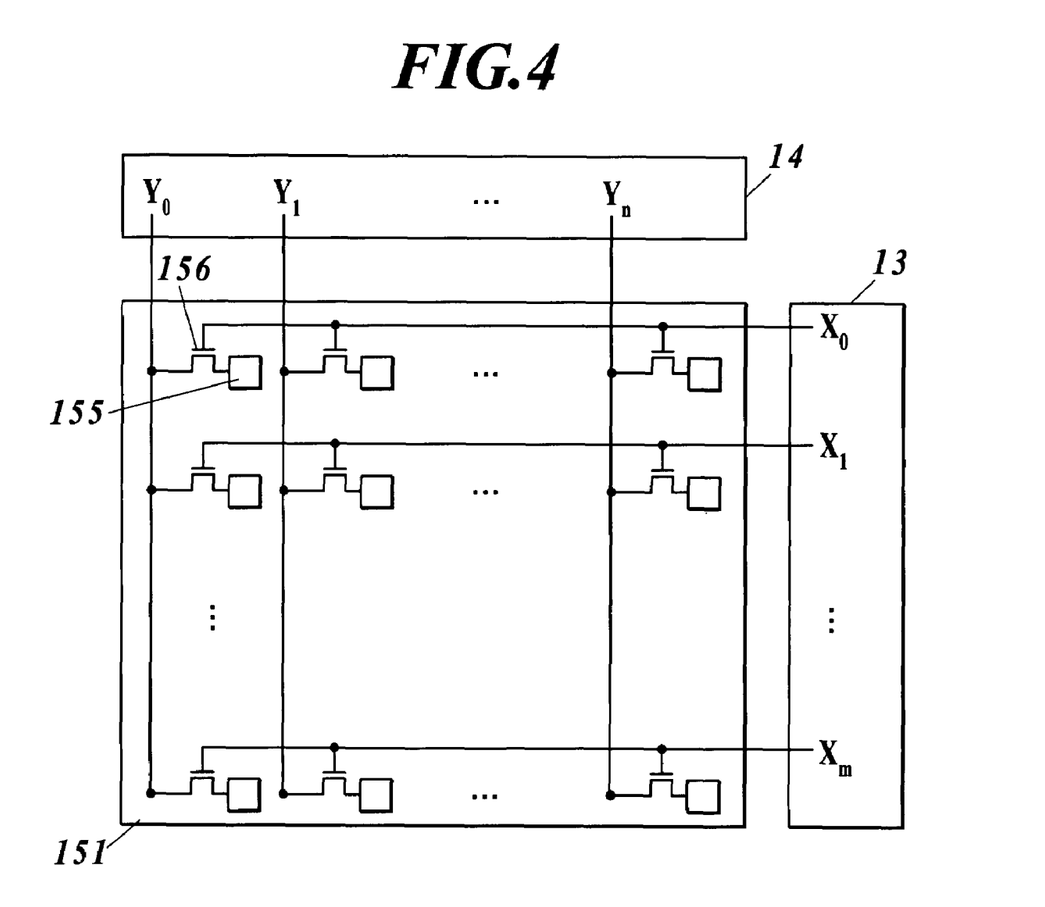
FIG. 4 is a plan view of a glass substrate in the liquid crystal display unit.

Incidentally, FIG. 1 is a block diagram illustrating a burn-in correction system S of the present embodiment. FIG. 2 is a block diagram showing the configuration of the principal parts of a television receiver 1 and an imaging apparatus 2 that constitute the burn-in correction system S of the present embodiment. FIG. 3 is a sectional view of a liquid crystal display unit 15 provided in the television receiver 1. Moreover, FIG. 4 is a plan view of a glass substrate 151 in the liquid crystal display unit 15.

As shown in FIG. 1, the present burn-in correction system S includes the television receiver 1 as a display means and a display apparatus and the imaging apparatus 2 as an imaging means, which are connected with each other through a communication line 3. The communication line 3 is a wireless communication line using an IR signal or the like, or a wired communication line using a cable or the like. The imaging apparatus 2 is connected to the television receiver 1 through the communication line 3 in a detachably attachable state to the television receiver 1.

(Configuration of Imaging Apparatus)

The imaging apparatus 2 is composed of, for example, an imaging device 21, an A/D converter 22, a transmission unit 23, a key input unit 24, a control unit 25 and the like.

The imaging device 21 is, for example, a semiconductor device such as a charge coupled device (CCD), a complementary metal-oxide semiconductor (CMOS) or the like. The imaging device images a display panel 15a of the television receiver 1, and thereby converts the strength of the light having entered therein through an imaging lens (not shown) into an electric signal to output the converted electric signal to the A/D converter 22.

The A/D converter 22 converts the analog electric signal input from the imaging device 21 into digital image data to output the converted digital image data to the transmission unit 23.

The transmission unit 23 transmits the imaged image data input from the A/D converter 22 to the television receiver 1 through the communication line 3.

The key input unit 24 is equipped with, for example, a plurality of keys for the user's inputting of various instructions by remote control, and outputs the input operation signal generated based on the detection of a user's key depression operation to the television receiver 1 through the communication line 3.

To put it concretely, the key input unit 24 is composed of a detection start button 24a. When the key input unit 24 detects a depression operation of the detection start button 24a, the key input unit 24 outputs the input operation signal based on the depression operation to the control unit 25. Then, when the input operation signal is transmitted from the imaging apparatus 2 to the television receiver 1 through the communication line 3, burn-in detection processing of the display panel 15a is led to be started by the control based on a lighting program 186a (which will be described later) by a CPU 181 of the television receiver 1 and by the control based on an imaging program 253a (which will be described later) by a CPU 251 of the imaging apparatus 2.

The control unit 25 is composed of the central processing unit (CPU) 251, a random access memory (RAM) 252, a read only memory (ROM) 253 and the like.

The CPU 251 executes various programs stored in the ROM 253 according to the input signal input from each unit of the imaging apparatus 2, and outputs output signals based on the executing programs to each unit to generally control the whole operation of the imaging apparatus 2.

The RAM 252 temporarily stores the processing results generated at the time of the execution of the various programs by the CPU 251, input data and the like.

The ROM 253 is equipped with various programs such as the imaging program 253a, a transmission program 253b and the like.

The imaging program 253a is a program to enable the CPU 251 to realize, for example, the function of acquiring imaged image data by imaging each pixel of the display panel 15a of the television receiver 1 from a viewing side, which pixel is lighted by the execution of the lighting program 186a, which will be described later.

To put it concretely, when an input operation signal instructing the start of the burn-in detection processing is input into the television receiver 1 through the communication line 3 by an depression operation of the detection start button 24a provided in the imaging apparatus 2 and the burn-in detection processing is started to light the pixels constituting the display panel 15a one by one at a predetermined interval (for example, the interval of 0.5 second), the CPU 251 images the display panel 15a from the viewing side with the imaging device 21 or the like to acquire the imaged image data generated by the imaging of the state in which each pixel is lighted. The imaging is performed at the timing synchronized with a synchronization signal input from the television receiver 1 through the communication line 3.

The CPU 251 functions as the imaging unit by executing such an imaging program 253a.

The transmission program 253b is a program for enabling the CPU 251 to realize, for example, the function of transmitting the imaged image data of each pixel, which has been imaged by the execution of the imaging program 253a, to the television receiver 1 through the communication line 3 with the transmission unit 23.

To put it concretely, when the imaged image data of each pixel in the lighted sate is acquired by the execution of the imaging program 253a, the CPU 251 transmits the imaged image data to the television receiver 1 through the communication line 3 with the transmission unit 23.

(Configuration of Television Receiver)

The television receiver 1 is composed of a signal input unit 11, a signal processing unit 12, a gate line drive unit 13, a data line drive unit 14, the liquid crystal display unit 15, a reception unit 16, an image memory 17, a control unit 18 and the like.

When an input image data, which is an image signal received by an antenna, a tuner unit and the like, which are not shown, is input into the signal input unit 11, the signal input unit 11 performs predetermined input signal processing to the input image data, and outputs the processed image data to the signal processing unit 12.

The signal processing unit 12 performs the processing of Y/C separation, color demodulation processing, matrix processing and the like to the input image data input from the signal input unit 11 to generate RGB signals, and performs the processing of the expansion and the reduction of an image, the interpolation, the gradation correction, the color correction and the like to the generated RGB signals to output the processed RGB signals to the data line drive unit 14.

The gate line drive unit 13 is provided correspondingly to each gate line X of the liquid crystal display unit 15, and supplies a voltage turning on or off thin film transistors 156 that range on the same gate line X to the gate line X.

The data line drive unit 14 is provided correspondingly to each data line Y of the liquid crystal display unit 15, and outputs a voltage according to the input image data input from the signal processing unit 12 to the data line Y in synchronization with the synchronization signal output from the gate line drive unit 13.

The liquid crystal display unit 15 is provided with, for example, the display panel 15a of the liquid crystal display (LCD) system of the active matrix drive system. The display panel 15a of the liquid crystal system is configured by gluing the glass substrate 151 and an opposed substrate 152 together, which opposed substrate 152 is disposed above the glass substrate 151 with a predetermined interval, and by holding the glass substrate 151 and the opposed substrate 152 between two polarization plates 153, as shown in FIGS. 3 and 4. A liquid crystal layer 154 is encloses between the glass substrate 151 and the opposed substrate 152, and back lights (not shown) are disposed on the back surface side of the glass substrate 151.

A plurality of pixel electrodes 155 is disposed in a matrix on the glass substrate 151, and an opposed electrode 157 is formed on the opposed substrate 152 so as to be opposed to the pixel electrodes 155. Each of the pixel electrodes 155 is disposed so as to be connected with a thin film transistor (TFT) 156 as an active device driving the pixel electrode 155 so as to be connected with a gate line X and a data line Y through the TFT 156. By a potential difference between a pixel electrode voltage supplied to the pixel electrodes 155 and an opposed electrode voltage supplied to the opposed electrode 157, only the orientation direction of the liquid crystal layer 154 in the area enclosed between the pixel electrodes 155 and the opposed electrode 157 is changed, and the liquid crystal layer 154 operates together with the polarization plates 153 and oriented films 158 formed on the pixel electrodes 155 and the opposed electrode 157 to pass or intercept light. Thus, the liquid crystal layer 154 functions as a liquid crystal shutter.

Gate lines X0-Xm are pixel selection circuits in the X direction, and are driven according to the voltages applied from the gate line drive unit 13. Moreover, data lines Y0-Yn are pixel selection circuits in the Y direction, and are driven according to the voltages applied from the data line drive unit 14.

When a desired pixel is lighted on the glass substrate 151, the CPU 181 select one gate line (for example, X1) and one data line (for example, Y0) among the gate lines X0-Xm and the data lines Y0-Yn, respectively, and makes the gate line drive unit 13 and data line drive unit 14 apply a predetermined voltage to the selected gate line X and the selected data line Y, respectively, to drive the thin film transistor 156 of the pixel at the place where the gate line X and the data line Y intersect with each other (for example, (X1, Y0)). Moreover, the light quantity transmitting each pixel is adjusted by a change of the level of the voltage supplied to the data line Y by the data line drive unit 14, and thereby the luminance of each pixel is led to be adjusted.

To put it concretely, the CPU 181 supplies a high potential voltage to the gate line X with the gate line drive unit 13, and supplies a voltage having the voltage value according to the input image data input from the signal processing unit 12 to the data line Y with the data line drive unit 14. Thereby, the CPU 181 lights the target pixel at the luminance based on the input image data. However, the pixel at which burn-in has occurred owing to a long time display of image data having high luminance is led to be lighted at the luminance higher than that of the input image data, and the pixel at which burn-in has occurred owing to a long time display of image data having low luminance is led to be lighted at the luminance lower than that of the input image data.

The reception unit 16 receives the imaged image data transmitted from the transmission unit 23 of the imaging apparatus 2 through the communication line 3, and outputs the received imaged image data to the image memory 17.

When the imaged image data transmitted from the imaging apparatus 2 has been input into the reception unit 16, the image memory 17 temporarily stores the imaged image data. The image memory 17 is configured so as to have an area capable of storing at least the same pieces of the imaged image data as the pixels constituting the display panel 15a.

The control unit 18 is composed of a central processing unit (CPU) 181, a random access memory (RAM) 182, a burn-in detection memory 183, a read only memory (ROM) 184 and the like.

The CPU 181 executes various programs stored in the ROM 184 in accordance with the input signals input from each unit of the television receiver 1, and outputs the output signals based on the executed programs to each unit. Thus, the CPU 181 generally controls the whole operation of the television receiver 1.

The RAM 182 temporarily stores the processing results generated at the time of the execution of the various programs by the CPU 181, input data and the like.

The burn-in detection memory 183 is made of, for example, a nonvolatile memory such as an erasable programmable ROM (EPROM) or the like, and stores the detection results pertaining to the presence or absence of burn-in at each pixel, which detection results have been detected by means of a calculation program 186c, which will be described later, and the correction values determined based on the difference values.

The ROM 184 is configured so as to include a data area 185 and a program area 186. The ROM 184 stores lighting data 185a in the data area 185, and stores various programs such as the lighting program 186a, a reception program 186b, the calculation program 186c, a correction program 186d and the like in the program area 186.

The lighting data 185a is the image data having fixed luminance as a preset lighting condition, and each pixel constituting the display panel 15a is led to be lighted in order based on the lighting data 185a at the time of the execution of the lighting program 186a, which will be described later.

The lighting program 186a is a program enabling the CPU 181 to realize, for example, the function of lighting each pixel constituting the display panel 15a in order under the preset lighting condition.

To put it concretely, when an input operation signal instructing the start of the burn-in detection processing is input into the television receiver 1 through the communication line 3 by an depression operation of the detection start button 24a provided in the imaging apparatus 2, the CPU 181 scans each gate line X of the gate lines X1-Xm in order with the gate line drive unit 13, and supplies a voltage turning on the thin film transistors 156 (to the state of having low resistance) ranging on the gate line X to each gate line X. The CPU 181 supplies a predetermined voltage based on the lighting data 185a as the preset lighting condition to each data line Y of the data lines Y0-Yn in order at a predetermined interval with the data line drive unit 14 during the period in which one gate line X is scanned. Consequently, the potential of the voltage applied to each data line Y is led to be applied to each pixel electrode 155. After the application of the voltage to the whole data line Y during the scanning of the gate line X has been completed, the CPU 181 supplies a voltage turning off the thin film transistors 156 (to the state of having high resistance) on the same gate line X to the gate line X with the gate line drive unit 13, and shifts to the scanning of the next gate line X.

Performing the processing for one frame means that each pixel constituting the display panel 15a is led to be successively lighted in the order of (X0, Y0)→(X0, Y1)→(X0, Y2)→ . . . →(Xm, Yn) one by one at the predetermined interval (for example, 0.5 second interval). Because the aforesaid lighting data 185a having the fixed luminance is supplied to each gate line X and each data line Y, each pixel is led to be lighted at the predetermined luminance based on the lighting data 185a when no burn-in has occurred thereat. On the other hand, when burn-in has occurred thereat, each pixel is led to be lighted at the luminance exceeding a predetermined error range of the luminance based on the lighting data 185a.

The CPU 181 functions as a lighting unit together with the lighting data 185a by executing such a lighting program 186a.

The reception program 186b is a program for enabling the CPU 181 to realize, for example, the function of receiving the imaged image data transmitted from the imaging apparatus 2 through the communication line 3 with the reception unit 16 by the execution of the transmission program 253b by the CPU 251 of the imaging apparatus 2. By the execution of the reception program 186b, the imaged image data transmitted from the imaging apparatus 2 is led to be stored in the image memory 17. The imaged image data is the image data acquired by imaging the display panel 15a in which only one pixel is being lighted from the viewing side, and the same pieces of imaged image data as the pixels constituting the display panel 15a are led to be transmitted from the imaging apparatus 2.

The calculation program 186c is the program for enabling the CPU 181 to realize, for example, the function of calculating the difference between the luminance of the imaged image data of each pixel, which data has been acquired by the execution of the imaging program 253a, and the preset luminance in the lighting condition.

To put it concretely, when the imaged image data for each pixel, which data has been received by the execution of the reception program 186b, has been stored in the image memory 17, the CPU 181 detects the luminance of each pixel imaged as each piece of the imaged image data in each imaged image data stored in the image memory 17. Furthermore, the CPU 181 compares the luminance of each pixel with the luminance of the lighting data 185a to judge whether the difference value between the luminance of the pixel and the luminance of the lighting data 185a is within the predetermined error range or not. When the difference value between the luminance of the pixel detected based on the imaged image data and the luminance of the lighting data 185a is within the predetermined error range, the CPU 181 judges that no burn-in has occurred at the pixel imaged as the imaged image data. On the other hand, when the difference value between the luminance of the pixel detected based on the imaged image data and the luminance of the lighting data 185a is not within the predetermined error range, the CPU judges that burn-in has occurred at the pixel imaged as the imaged image data. Furthermore, the CPU 181 acquires the difference value of the luminance of the pixel that has been detected as the pixel at which burn-in has occurred, which luminance has been detected based on the imaged image data, and the luminance of the lighting data 185a as the data indicating the degree of the burn-in.

For example, if the difference value between the luminance of the pixel detected based on the imaged image data and the luminance of the lighting data 185a is within the range of ±15 gradations where the luminance of the lighting data 185a is expressed by 256 gradations and the error range is set to ±15 gradations, then the CPU 181 judges that no burn-in has occurred at the pixel. On the other hand, if the difference value between the luminance of the pixel detected based on the imaged image data and the luminance of the lighting data 185a is not within the range of ±15 gradations, then the CPU 181 judges that burn-in has occurred at the pixel.

Furthermore, a correction value is determined to the pixel that is judged to have the occurred burn-in based on the difference value at the pixel. The correction value is a value to be referred to in the correction processing of the luminance by the execution of the correction program 186d, which will be described later. Both of the fact of the presence or absence of burn-in and the correction value determined based on the difference value are output to the burn-in detection memory 183, and are led to be stored therein in association with the pixel number n for identifying each pixel.

The correction program 186d is the program enabling the CPU 181 to realize, for example, the function of correcting the luminance of each pixel based on input image data, which correction is performed based on a difference value calculated by the calculation program 186c.

To put it concretely, when the detection of the presence or absence of burn-in by the calculation program 186c mentioned above and the determination of the correction values based on the difference values have been performed, the CPU 181 reads the detection results of the presence or absence of the burn-in and the correction values, which are stored in the burn-in detection memory 183, at the time of the display of an image on the display panel 15a, which display is performed after the detection and the determination. Then, the CPU 181 changes the voltage values of the pixels at which burn-in has occurred according to the read presence or absence of the burn-in and the read correction values. That is, the CPU 181 performs the correction of the burn-in of the pixels at which the burn-in has occurred by adjusting the voltages to be applied to the data lines Y with the data line drive unit 14 according to the correction values read from the burn-in detection memory 183.

For example, if the difference value between the luminance of a pixel detected based on the imaged image data and the luminance of the lighting data 185a is not within the range of ±15 gradations (for example, +20) and it is consequently judged that burn-in has occurred in the pixel when the error range is set to ±15 gradations, the data line drive unit 14 applies a voltage signal to which a correction value (for example, −20) has been operated, which correction value has been determined based on the difference value, to the data line Y to which the pixel is connected. By performing the processing to the whole pixel data constituting the input image data, the voltage of each pixel is accurately corrected, and the image that has no burn-in is led to be displayed on the display panel 15a.

The CPU 181 constitutes a correction unit together with the calculation program by executing such a correction program 186d.

Figure 5A:
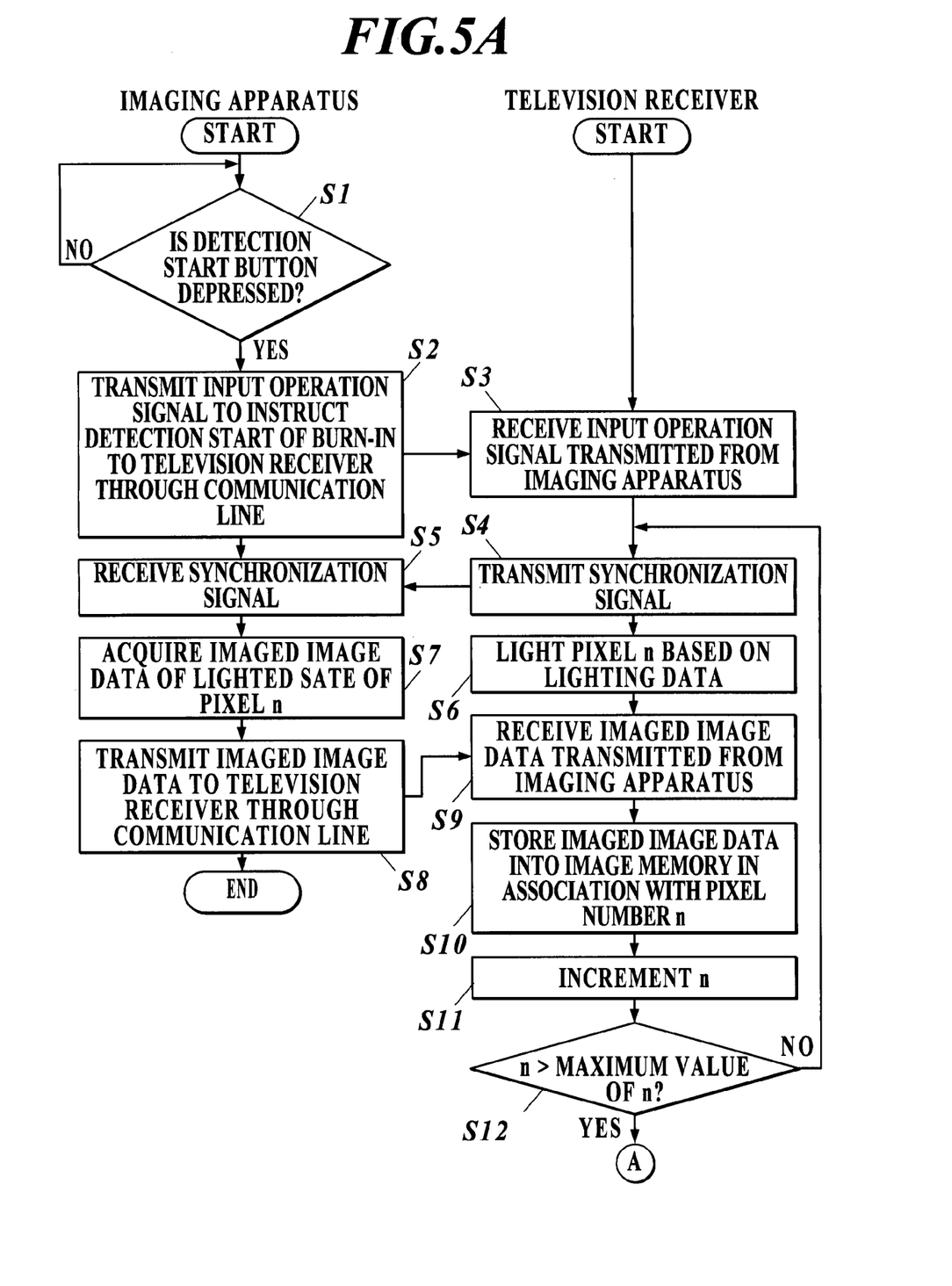
FIGS. 5A and 5B are a flow chart showing burn-in detection processing by the CPU of the television receiver and the CPU of the imaging apparatus.
Figure 5B:
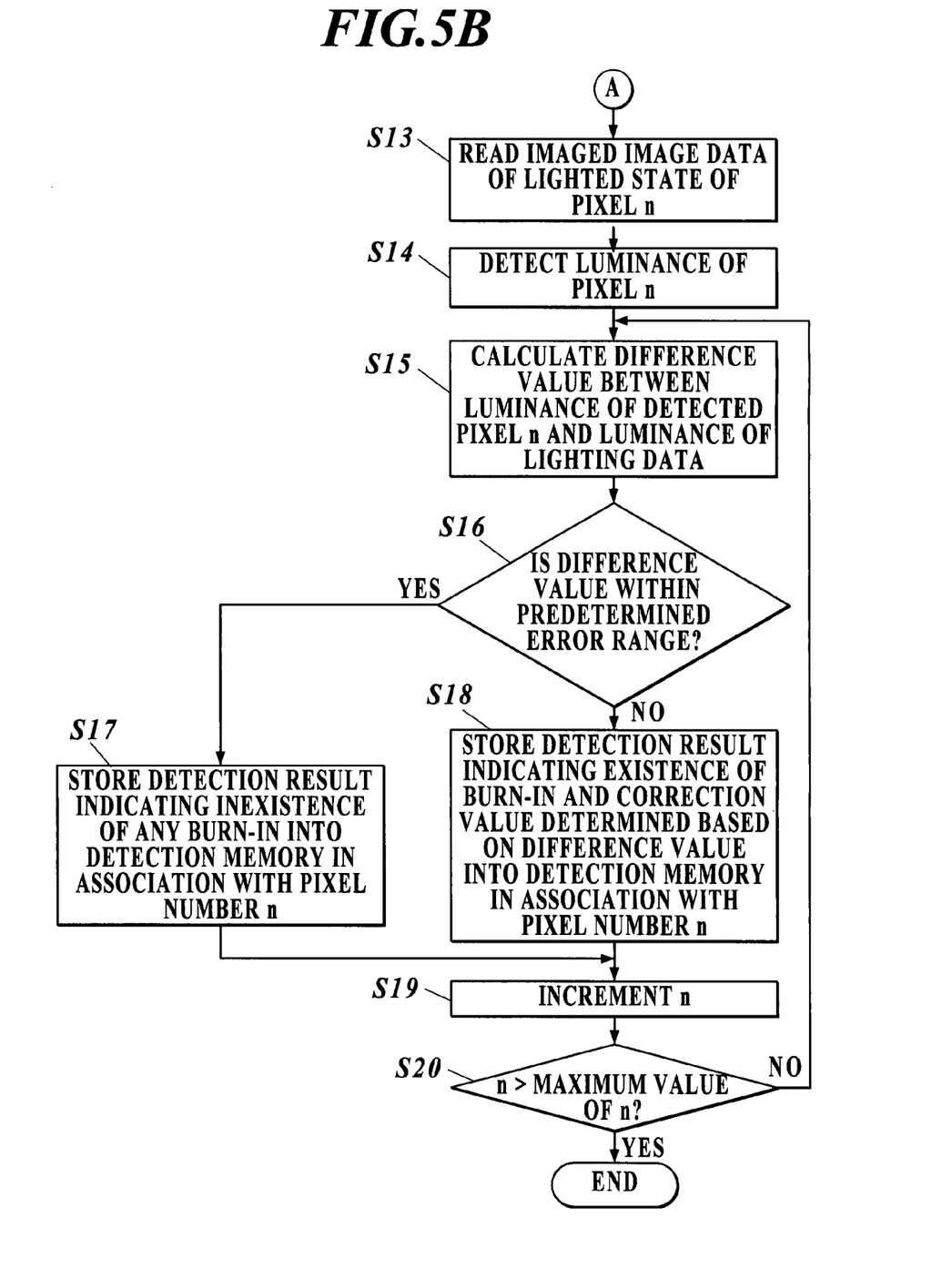

Next, the burn-in detection processing of the display panel 15a that is executed by the CPU 181 of the television receiver 1 and the CPU 251 of the imaging apparatus 2 will be described, referring to FIG. 5. The present processing is performed by the execution of the lighting program 186a, the reception program 186b, the calculation program 186c and the correction program 186d by the CPU 181 and by the execution of the imaging program 253a and the transmission program 253b by the CPU 251.

First, the CPU 251 of the imaging apparatus 2 judges the presence or absence of a depression of the detection start button 24a in the key input unit 24 at Step S1. When the CPU 251 judges that the depression of the detection start button 24a has been performed at Step S1 (Step S1; Yes), the CPU 251 next transmits an input operation signal instructing the detection start of burn-in to the television receiver 1 through the communication line 3 (Step S2).

When the CPU 181 of the television receiver 1 receives the transmitted input operation signal from the imaging apparatus 2 through the communication line 3 at Step S3, the CPU 181 begins the detection processing of burn-in based on the input operation signal, and transmits a synchronization signal indicating the timing of lighting and imaging to the imaging apparatus 2 through the communication line 3 (Step S4). The CPU 251 of the imaging apparatus 2 receives the synchronization signal transmitted from the television receiver 1 through the communication line 3 at Step S5.

The CPU 181 of the television receiver 1 lights a pixel n of the display panel 15a at predetermined luminance based on the lighting data 185a stored in the ROM 184 with the gate line drive unit 13 and the data line drive unit 14 (the initial value of n=1) at Step S6. The CPU 251 of the imaging apparatus 2 images the display panel 15a of the television receiver 1 to acquire the imaged image data in which the lighting pixel n is imaged at Step S7. Successively, the CPU 251 transmits the imaged image data acquired at Step S7 to the television receiver 1 through the communication line 3 (Step S8).

The CPU 181 of the television receiver 1 receives the imaged image data transmitted from the imaging apparatus 2 through the communication line 3 at Step S9. Next, the CPU 181 stores the imaged image data received at Step S9 into the image memory 17 in association with the pixel number n at Step S10.

The CPU 181 increments the pixel number n at Step S11, and judges whether the pixel number n is the maximum value or not (Step S12).

When the CPU 181 judges that the pixel number n is not the maximum value at Step S12 (Step S12; No), the CPU 181 returns its processing to that at Step S4, and repeats the processing mentioned above. On the other hand, when the cup 181 judges that the pixel number n is the maximum value (Step S12; Yes), the CPU 181 advances the processing to that at Step S13.

The CPU 181 reads the imaged image data imaged during the lighting of the pixel n from the image memory 17 (the initial value of n=1) at Step S13. Next, the CPU 181 detects the luminance of the pixel n based on the read imaged image data (Step S14), and calculates the difference value between the luminance of the detected pixel n and the luminance of the lighting data 185a (Step S15). The CPU 181 judges whether the difference value calculated at Step S15 is within the predetermined error range or not at Step S16. Then, when the CPU 181 judges that the difference value is within the predetermined error range at Step S16 (Step S16; Yes), the CPU 181 stores the detection result indicating the inexistence of any burn-in into the burn-in detection memory 183 in association with the pixel number n at Step S17. On the other hand, when the CPU 181 judges that the difference value is not within the predetermined error range at Step S16 (Step S16; Yes), the CPU 181 determines a correction value based on the difference value at Step S18, and stores the detection result indicating the existence of the burn-in and the correction value determined based on the difference value into the burn-in detection memory 183 in association with the pixel number n (Step S18).

The CPU 181 increments the pixel number n at Step S19, and judges whether the pixel number n exceeds the maximum value of n or not at Step S20. When the CPU 181 judges that the pixel number n does not exceed the maximum value of n at Step S20 (Step S20; No), the CPU 181 returns the processing to that at Step S13, and repeats the processing mentioned above. On the other hand, when the CPU 181 judges that the pixel number n exceeds the maximum value of n (Step S20; Yes), the CPU 181 terminates the present processing.

Figure 6:
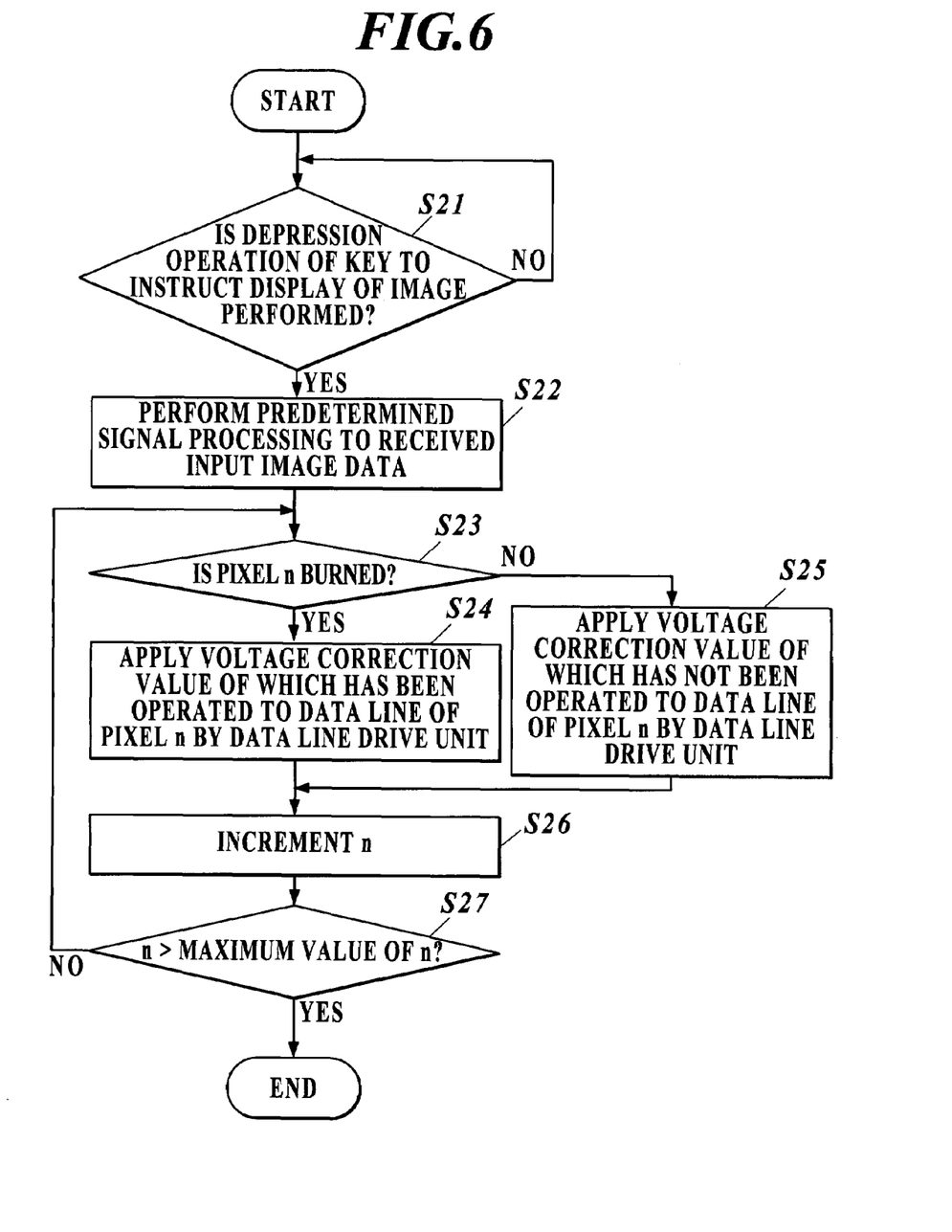
FIG. 6 is a flow chart showing burn-in correction processing by the CPU of the television receiver.

Next, the burn-in correction processing of the television receiver 1 by the CPU 181 will be described, referring to FIG. 6. The present processing is performed by the execution of the correction program 186d by the CPU 181.

The CPU 181 monitors the depression operation of the keys of the key input unit 24, and judges the presence or absence of the key depression operation of the power source turning-on key instructing the display of an image on the display panel 15a at Step S21.

When the CPU 181 judges that the depression operation of the key instructing the display of an image has been performed at Step S21 (Step S21; Yes), the CPU 181 next receives input image data with the signal input unit 11, and performs predetermined signal processing of the received input image data in the signal processing unit 12 and the like (Step S22). Next, the CPU 181 reads the data in the burn-in detection memory 183, and judges whether the burn-in has occurred at the pixel n (the initial value of n=1) or not based on the data of the burn-in detection memory 183 (Step S23). When the CPU 181 judges that the burn-in has occurred at the pixel n at Step S23 (Step S23; Yes), the CPU 181 reads the correction value corresponding to the pixel n stored in the burn-in detection memory 183, and applies the voltage to which the correction value has been operated based on the input image data to the data line Y of the pixel n with the data line drive unit 14 (Step S24). On the other hand, when the CPU 181 judges that no burn-in has occurred at the pixel n at Step S23 (Step S23; No), the CPU 181 applies the voltage to which no correction values have been operated to the data line Y of the pixel n based on the input image data with the data line drive unit 14 (Step S25). Next, the CPU 181 increments the pixel number n at Step S26, and judges whether the n has exceeded the maximum value of n or not at Step S27. When the CPU 181 judges that the pixel number n does not exceeds the maximum value of n at Step S27 (Step S27; No), the CPU 181 returns the processing to that at Step S23, and repeats the processing mentioned above. On the other hand, when the CPU 181 judges that the pixel number n has exceeded the maximum value of n (Step S27; Yes), the CPU 181 terminates the present processing.

By the burn-in correction system S according to the present invention, which has been described above, each pixel constituting the display panel 15a is lighted in order under the preset lighting condition by the execution of the lighting program 186a by the CPU 181 of the television receiver 1, and each pixel lighted by the lighting program 186a is imaged from the viewing side by the execution of the imaging program 253a by the CPU 251 of the imaging apparatus 2. Then, the imaged image data is acquired. Moreover, the difference value between the luminance of the imaged image data of each pixel acquired by the imaging program 253a and the luminance preset in the lighting condition is calculated by the execution of calculation program 186c by the CPU 181 of the television receiver 1, and the luminance of each pixel based on the input image data is corrected based on the difference value calculated by the execution of the calculation program 186c, which correction is performed by the execution of the correction program 186d of the CPU 181 of the television receiver 1. Consequently, the detection and the correction of burn-in is performed by the pixel, the cooler deterioration owing to the burn-in can be accurately corrected.

Incidentally, the present invention is not limited to the embodiment mentioned above, and various improvements and alterations of the design thereof may be performed without departing from the sprit of the present invention.

For example, the display apparatus is not limited to the television receiver 1, and may be a monitor provided in a personal computer (PC) or the like.

The present U.S. patent application claims a priority under the Paris Convention of Japanese patent application No. 2006-085983 filed on Mar. 27, 2006, and shall be a basis of correction of an incorrect translation.

What is claimed is:

1. A burn-in correction system including a display unit equipped with a display panel displaying an image according to input image data, and an imaging unit connected to the display unit through a communication line, the imaging unit acquiring imaged image data by imaging the display panel from a viewing side, the system correcting burn-in on the display panel, the system comprising:
    a lighting unit lighting each pixel constituting the display panel in order under a preset lighting condition;
    a calculation unit calculating a difference value between luminance of the imaged image data of each pixel lighted by the lighting unit, the imaged image data acquired by imaging each lighted pixel with the imaging unit, and luminance preset in the lighting condition; and
    a correction unit correcting luminance of each pixel based on the input image data, the correcting performed based on the difference value calculated by the calculation unit.

2. A display apparatus connected to an imaging unit acquiring imaged image data through a communication line, the apparatus equipped with a display panel displaying an image according to input image data, the apparatus comprising:

a lighting unit lighting each pixel constituting the display panel in order under a preset lighting condition; and a correction unit correcting luminance of each pixel based on the input image data, the correcting performed based on luminance of the imaged image data of each pixel acquired by imaging each pixel with the imaging unit from a viewing side, each pixel lighted by the lighting unit.

3. The display apparatus according to claim 2, wherein the correction unit includes a calculation unit calculating a difference value between the luminance of the imaged image data of each pixel, the luminance acquired by the imaging unit, and luminance preset in the lighting condition, and the correction unit corrects the luminance of each pixel based on the input image data, the correction performed based on the difference value calculated by the calculation unit.

4. A burn-in correction method for a burn-in correction system including a display apparatus equipped with a display panel displaying an image according to input image data, and an imaging apparatus connected to the display apparatus through a communication line, the method being for correcting burn-in on the display panel, the method comprising the steps of:

lighting each pixel constituting the display panel in order under a preset lighting condition;

acquiring imaged image data by imaging each lighted pixel from a viewing side with the imaging apparatus; and correcting luminance of each pixel based on the input image data, the correcting performed based on luminance of the imaged image data of each pixel, the imaged image data acquired by the imaging apparatus.

* * * * *